Aug. 5, 1941.　　　　　G. D. CLARK　　　　　2,251,398

MOTOR MOUNTING

Filed May 29, 1939

INVENTOR
George D. Clark.
BY
Spencer, Hardman & Fehr
his ATTORNEYS

Patented Aug. 5, 1941

2,251,398

UNITED STATES PATENT OFFICE 2,251,398

MOTOR MOUNTING

George D. Clark, Warren, Ohio, assignor to General Motors Corporation, Detroit, Mich., a corporation of Delaware Application May 29, 1939, Serial No. 276,357

5 Claims. (Cl. 248—26)

This invention relates to a mounting for resiliently supporting electric motors and the like.

It is known to those skilled in the art to mount an electric motor on cushioning material, such as soft rubber blocks in order to dampen vibrations set up in the motor housing due to rapid rotation of the armature therein and prevent transmission of vibrations to the supporting structure. In one form of motor mounts the end members of the motor housing are provided with noncircular bearing portions and the rubber block serving to dampen the noise is provided with a central non-circular opening to fit over the bearing portion. The rubber block is then clamped within a recess in a support.

By this arrangement and design the flexibility of the rubber is considerably impaired since the rubber cannot flow sufficiently, radially or circumferentially, owing to it being held within certain boundaries by the support and the clamping means. The rubber at the corners which takes all the stress is largely in a high state of compression and this cannot absorb the shock of the motor as quietly as desired as the rubber held under compression will not permit the proper deformation of the rubber ring. In this manner the dampening effect of the rubber ring is, consequently, materially impaired.

An object of the present invention is to provide improved cushioning mounts which will effectively dampen vibrations and noise to the support of the motor and to the surrounding structure than the devices heretofore employed. This is accomplished by providing a one-piece cushioning block that is so constructed and mounted on a non-circular bearing portion of the motor housing and within a recess of the supporting member that will relieve compression of the cushioning material where the stresses are the highest. To this end the cushioning member is preferably recessed at the corners of the non-circular portion of the block so as to relieve compression of the cushioning material when the cushioning block is clamped in place in the support and cause the cushioning member to act in shear to absorb the turning effort of the motor housing relative to the support.

Further objects and advantages of the present invention will be apparent from the following description, reference being had to the accompanying drawing wherein a preferred embodiment of the present invention is clearly shown.

Figure 1:
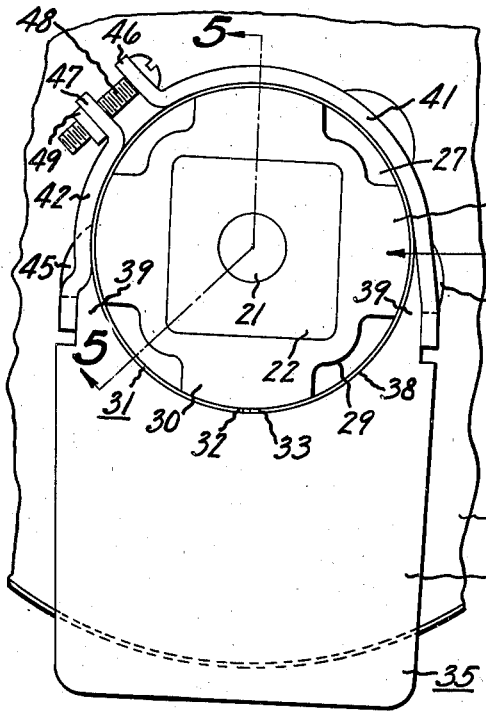
Fig. 1 is an end elevation of a motor mounting embodying the present invention showing a fragment of a motor.
Figure 2:
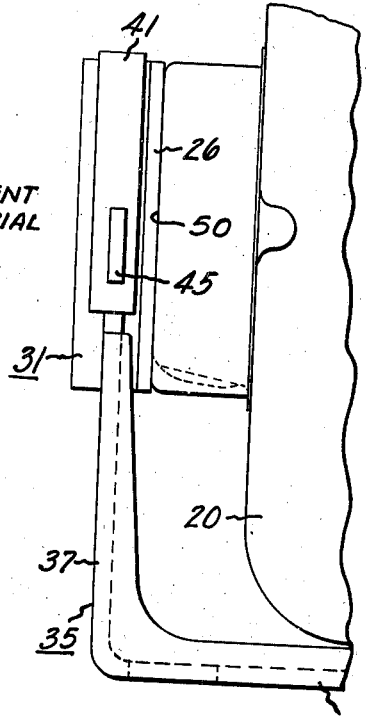
Fig. 2 is a side elevation of the motor mounting shown in Fig. 1.
Figure 3:
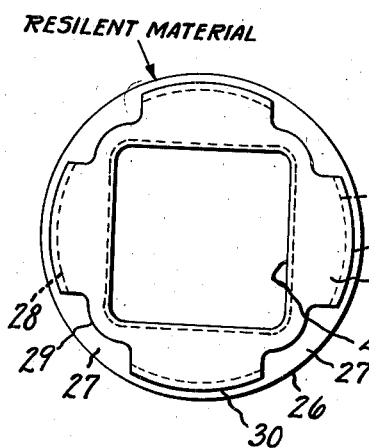
Fig. 3 is an end view of a cushioning block.
Figure 4:
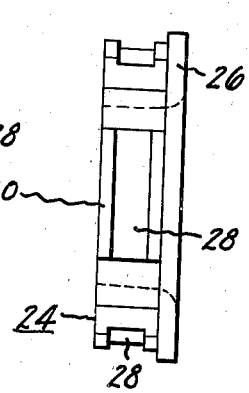
Fig. 4 is a side view of the cushioning block shown in Fig. 3.
Figure 5:
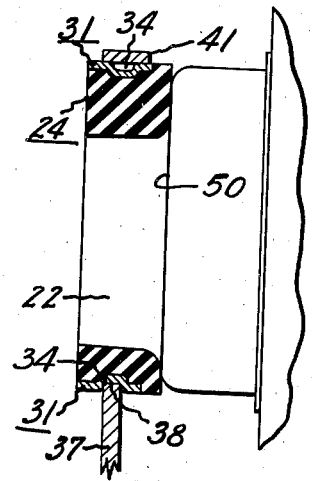
Fig. 5 is a sectional view taken on the line 5—5 of Fig. 1.

Referring to Figs. 1 and 2, 20 designates a fragment of an end member one of which is adapted to be supported at each end of a motor frame, not shown. The rotating member or armature of the motor is secured to a shaft 21 which is journaled in the end members. Each of the end members has an integral boss or hub 22 of non-circular formation. Each hub 22 is supported by a block 24 of resilient material, preferably soft rubber, having a non-circular opening 25 complementary to the external surface of the hub or projection 22. Each block 24 is provided with a flange portion 26 located between the motor frame shoulder 50 and a clamping ring 31. The flange 26 is integral with lugs 30 joined by relatively thin portions 29 spaced from the ring 31 by notches 27. Each lug 30 is provided with an arcuate groove 28. It will be noted that the notches 27 are adjacent the corners of the hub 22. Since the portions 29 are spaced from the ring 31 by the notches 27, compression of the block 24 is relieved at the corners of the hub 22, when the block 24 is clamped to a bracket or base 35. This construction permits the lugs 30 to act in shear to absorb torsional vibrations of the motor frame.

A metal band 31 provided with spaced ends 32 and 33, see Fig. 1, and a circumferential channel 34 therein is adapted to fit over the lugs 30 with the channel 34 registering with the grooves 28 when the band is assembled with the block 24.

The bracket or base 35 for supporting the motor is generally of U-shaped formation, comprising a yoke 36 and a pair of arms 37. Only one of the arms 37 is shown, but it is to be understood that the other arm is similar in construction. The upper end of the arm 37 is provided with an arcuate recess 38 to provide spaced ends 39. The marginal edge of the recess 38 is adapted to extend into the channel 34 of the band 31 so as to prevent axial movements of the band 31 relative to the arms 37. The band 31 and the block 24 are secured to the bracket 35 by clamping members 41 and 42, having slots in the lower ends thereof engaging projections 45 formed by notching the ends 39. The upper ends of the clamping members are bent outwardly to provide apertured ears 46 and 47 through which pass a bolt 48. The bolt has screw threaded engagement with a nut 49 to draw the ears 46 and 47 together and forces the channel 34 into firm frictional engagement with the marginal edge of the arcuate recess 38 of the arm 37, and the channel 34 into engagement with the grooves 28 of the lugs 30.

As the block is compressed by the clamping members 41 and 42 the lugs 30 are firmly urged against the flat surfaces of the hub 22. Since the rubber block is provided with radially extending notches 27, the compression of rubber is relieved thus allowing the lugs 30 to act in shear to absorb the torsional vibration of the motor frame.

The flange portion 26 on the block 24 will permit the housing to have slight axial movements. The flange 26 is disposed between the ring 31 and the shoulder 50 on the end member 20. The motor housing is thus yieldably supported at each end by a cushioning block providing, in effect, spaced lugs 30 (except as they are joined by the thin sections 29). The lugs 30 operate practically independently of each other and therefore operate freely in shear to absorb torsional vibrations of the motor frame. This construction provides quieter operation of the motor because the blocks 24 operate more efficiently to absorb vibrations. The relieving of compression stress in the rubber block 24 by the provision of the notches 27, eliminates the kind of stress which would cause relatively rapid deterioration of the rubber. Therefore the present construction provides a rubber mounting which is more durable.

While the embodiment of the present invention as herein disclosed, constitutes a preferred form, it is to be understood that other forms might be adopted, all coming within the scope of the claims which follow.

What is claimed is as follows:

1. In combination with an electric motor having a non-rounded boss including a support, of a continuous annular resilient member comprising a ring having a plurality of depressions on the outer periphery thereof fitted about the boss with the depressions adjacent the corners of the boss, a removable split metallic ring disposed about the resilient member depressions, and a metallic clamping member cooperating with the split ring disposed about the resilient member for holding the resilient member under compression by engaging the high portions only on the periphery thereof whereby the resilient member is spread outwardly at the depressions thereof for preventing excessive compression of the resilient member within the metallic ring.

2. In combination, an electric motor having a non-rounded boss, a support for the motor; a removable one-piece resilient body interposed between the boss and the support, said resilient body comprising a continuous ring of live rubber having a plurality of relieved portions adjacent the corners of the boss and having a flange joining one side of the member for closing the spaces between the relieved portion, said flange engaging a shoulder provided by the motor cushioning axial movements of the motor in respect to the support, and said relieved portions permitting certain portions of the continuous body to flow unconfined therein while those portions of the ring are under high compression.

3. In combination, an electric motor having a non-rounded boss, a support for the motor; a removable one-piece body disposed between the boss and the support, said body comprising a continuous ring of resilient material having a non-rounded opening to receive the boss and having a plurality of notch portions on the outer surface thereof adjacent the corners of the boss and having a flange joining one side of the member for closing the spaces between the notch portion, said flange engaging a shoulder provided by the motor to cushion axial movement of the motor in respect to the support and said notches permitting certain portions of the body to flow unconfined therein when the body is under high compression.

4. In a resilient mounting for a motor, the combination of a frame provided with a non-rounded boss and having a shoulder adjacent the boss; a removable one-piece resilient member comprising a plurality of depressions on the outer surface thereof and having a flange joining one side of the resilient member for closing the depression at said side, said resilient member being fitted about the boss with the flange adjacent the shoulder and the depressions adjacent the corners of the non-rounded hub, a removable metal band about the resilient member and so arranged that the flange is between the shoulder and the inner edge of the metal band, a support having spaced apart ends engaging the band; and means including a clamp for engaging the support and forcing the band into engagement with the support for securing the band to the support, said band being forced against the high portions of the resilient member to place the resilient member under compression, said high portion being free to spread outwardly at the depressions to prevent excessive compression of the resilient member within the metallic ring.

5. In a resilient mount for a motor the combination of a motor frame having a non-circular hub projection therefrom; a removable one-piece resilient member comprising alternate heavy and thin portions on the outer surface thereof and having a flange joining one side of the resilient member for closing the space between the heavy portions and thin portions and extending beyond the outer surface of the heavy portions, said resilient member being fitted about the boss with the thin portions adjacent the corners of the boss and flange adjacent a shoulder provided by the frame; a support having a recess open at one side to receive the resilient member; a detachable clamping means across the open end of the recess for retaining the resilient member within recess of the support and hold the flange against the shoulder whereby the flange will cushion axial movements of frame in respect to the support, said clamping means also placing the heavy portions under high compression said heavy portions being free to spread circumferentially at the notches to prevent excessive compression of the resilient member.

GEORGE D. CLARK.